Aug. 25, 1959 M. V. SULLIVAN 2,901,532

BURST SEPARATOR FOR COLOR TELEVISION

Filed Dec. 4, 1953 2 Sheets-Sheet 1

INVENTOR
MICHAEL V. SULLIVAN

BY Hugh S. Wertz

ATTORNEY

Aug. 25, 1959 M. V. SULLIVAN 2,901,532

BURST SEPARATOR FOR COLOR TELEVISION

Filed Dec. 4, 1953 2 Sheets-Sheet 2

INVENTOR
MICHAEL V. SULLIVAN

BY Hugh S. Wertz
ATTORNEY

United States Patent Office 2,901,532 Patented Aug. 25, 1959

2,901,532

BURST SEPARATOR FOR COLOR TELEVISION

Michael V. Sullivan, Florham Park, N.J., assignor to Bell Telephone Laboratories, Incorporated, New York, N.Y., a corporation of New York Application December 4, 1953, Serial No. 396,152

2 Claims. (Cl. 178—5.4)

This invention relates to color television receiver systems and particularly to circuits for the color synchronizing signals used therein.

Television signal specifications proposed as standards for compatible monochrome-color television by the National Television Systems Committee as presented in the Petition of Radio Corporation of America, Incorporated and National Broadcasting Company, Incorporated, before the Federal Communications Commission, June 25, 1953, pages 35 through 38, describe a composite color television picture signal including a luminance signal and a chrominance signal. The luminance signal provides the brightness information of a given picture element which is utilized in both the monochrome and color television systems and is known as the monochrome portion of the color picture signal. The chrominance signal conveys the color information of a given picture element for use in the color tube system and includes phase and amplitude modulated signals which determine the hue, or color of the picture element, and the saturation, or white tint, in the color of the picture element.

The hue and saturation information is modulated on to a single carrier frequency, which is commonly known as the color subcarrier, by using two subcarriers of the same frequency but 90 degrees apart in phase. These subcarriers are suppressed in the transmitter and only the sidebands are transmitted in the composite signal. At the receiver the color subcarriers are reinserted to recover the color information. To control the generation of the color subcarriers in the receiver there is transmitted in the composite color picture signal a color synchronizing pulse in addition to the standard vertical and horizontal synchronizing and blanking pulses included therein. The vertical and horizontal synchronizing and blanking pulses are the same as those specified for monochrome television modified only to provide for the inclusion of the color synchronizing pulse.

In the composite color picture signal the color synchronizing pulse is transmitted in the form of a "burst" of no less than eight cycles of the color subcarrier frequency having a fixed phase with reference to one of the color subcarriers of the transmitter and appears immediately following each horizontal synchronizing pulse. In the receiver the burst is separated from the composite signal and used in conjunction with a local oscillator, a phase shifter and a carrier frequency control circuit to generate two continuous wave signals of the color subcarrier frequency and having a 90 degree phase displacement from each other. These two continuous signals are modulated with the transmitted chrominance signal in a receiver demodulator to recover the hue and saturation information. It is clear that for accurate reproduction of the hue and color information at the receiver, it is necessary that the two color subcarriers generated therein be critically controlled in both phase and frequency with respect to that of the burst signal. In view thereof, it is of prime importance that the circuits for separating the color synchronizing bursts from the composite television signal do so without introducing frequency or phase distortion into the separated burst signal.

An object of the invention is to provide a new and improved circuit for separating the color synchronizing burst from the composite color picture signal.

An additional object of the invention is to provide a gating circuit for the burst separator that produces in the output thereof a signal including only the color synchronizing burst.

There is provided in one embodiment of the invention a color television receiver wherein the color synchronizing circuit comprises a gate pulse generator activated by the horizontal synchronizing pulses of the composite picture signal, a color synchronizing burst separator, a burst phase shifter, a carrier frequency control and an oscillator. The separated burst operates through the phase shifter and carrier frequency control to produce in the output of the oscillator two color subcarriers of the color subcarrier frequency differing in phase by 90 degrees. The burst separator comprises a cascaded pair of gate circuits each operated by one of the two pulses from the gate pulse generator. The gating pulses are of simultaneous occurrence, equal duration and of opposite polarity. Two gating stages are used to insure that only the energy from the burst signal is passed. This is important because the burst occurs for only a small fraction of each television line time and its energy is slight as compared to that of the picture signal and a small leakage in energy from the picture signal is sufficient to take over control of the oscillator. The first gate circuit separates the burst from the composite picture pulse and the output thereof is essentially the color synchronizing burst on a step voltage which is representative of the associated gating pulse. This output is applied to the second gating circuit comprising a pair of electron tubes connected in push-pull relationship and operated by the second of the gating pulses. By using a balanced output circuit in this second gating circuit the signal components due to the gating pulses appearing therein cancel each other and there remains only a signal which is a true representation in frequency and phase of the color synchronizing burst.

An important advantage of this arrangement is that the signal separated from a composite signal train is an accurate representation of signal as it appears in the composite signal train.

Another important advantage of the arrangement is that the recovery of color signals in the receiver is accurately controlled whereby true and clear chromatic information is provided to the screen of the color picture tube system.

While the invention is described largely in terms of color television systems, it will appear obvious to those skilled in the art that the invention and its applications are not limited to the field of television but are equally suited for use in other fields of the electronic arts.

The invention, its objects and advantages will be better understood by referring to the following disclosures and the drawings forming a part thereof wherein.

Figures 1, 2:
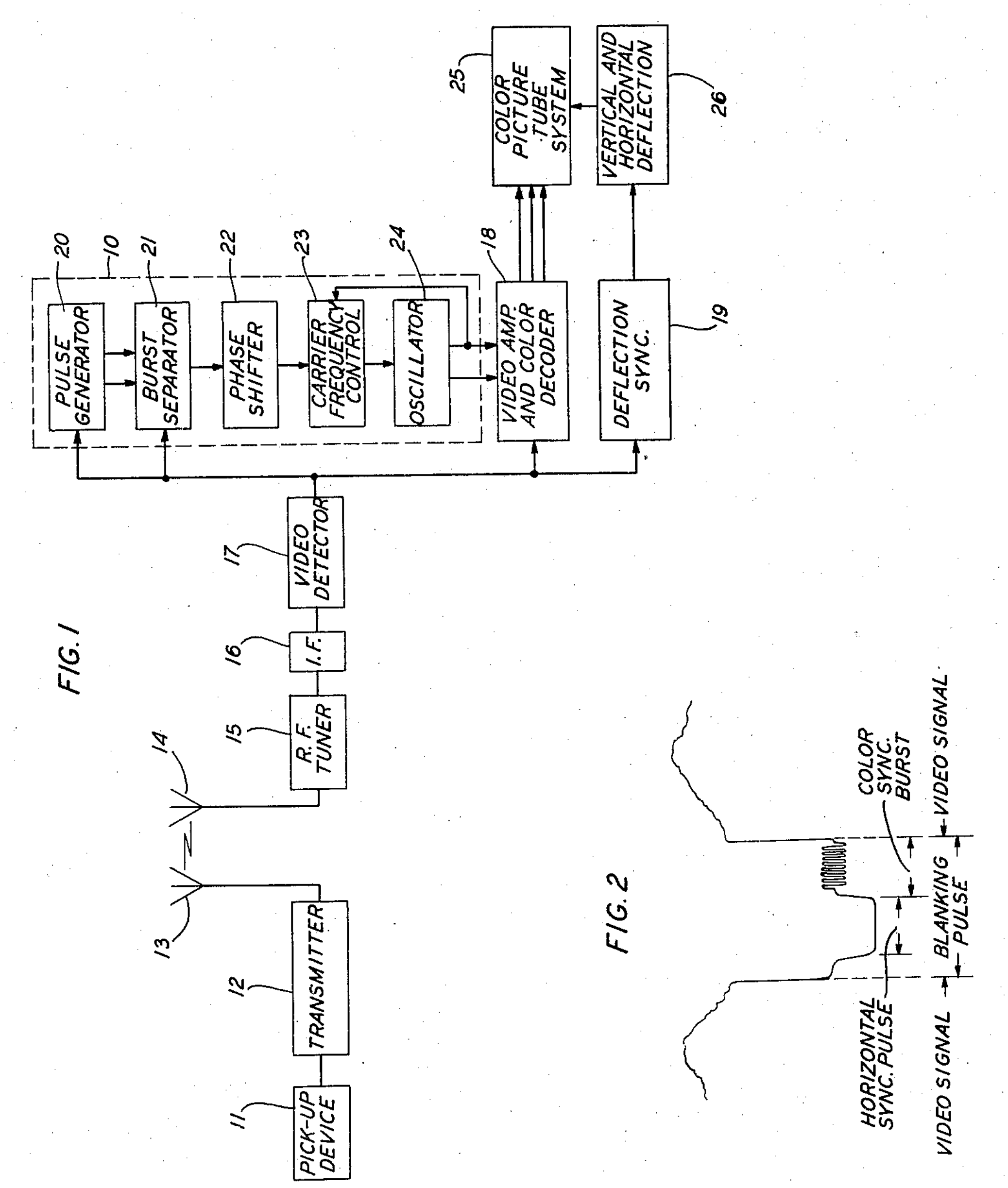
Fig. 1 is a block schematic diagram of a complete color television system in which the color synchronizing circuit is shown in somewhat greater detail than the rest of the circuit.
Fig. 2 shows a composite color picture synchronizing signal including the color synchronization pulse.

Referring more specifically to the drawings, Fig. 1 shows by way of example, for purposes of illustrating the invention and in block diagram form, a complete color television receiver system embodying a color synchronizing system in the receiver thereof in accordance with the invention. The color synchronizer is represented by the elements within the dash-dot rectangle 10. The object to be color televised is viewed by a color pickup device 11 such as that described on pages 446 to 488 in the R.C.A. petition. The signals generated therein are amplified in accordance with the proposals of the N.T.S.C. and modulated in a transmission circuit 12 of a type described in the R.C.A. petition pages 489 to 496 and applied to transmitting antenna 13. The receiving antenna 14 intercepts a part of the signal radiated from antenna 13 and applies it to a radio frequency tuner circuit 15 wherein the signal is first detected and amplified. An intermediate frequency circuit 16 and a video detector circuit 17 further detects and amplifies the composite color picture signal and applies it respectively to a color synchronizing circuit 10 in accordance with the invention, to a video amplifier and color decoder circuit 18 and to a deflection synchronizing circuit 19. In the color synchronizer circuit the composite signal is applied to a pulse generator circuit 20 and a burst separator circuit 21. In the pulse generator the horizontal synchronizing pulses are stripped from the composite signal and used to generate two oppositely poled gating pulses which are delayed to occur during the burst interval of the composite signal and have a duration substantially equal to that of the burst interval. These gating pulses, in addition to the composite signal, are applied to the burst separator wherein the color synchronizing burst pulse is gated therethrough appearing in the output comprising only the frequency of the burst. This color synchronizing signal is then applied through a variable phase shifter 22 to a carrier frequency control circuit 23. The local oscillator 24 is tuned to generate two signals of substantially the burst frequency and ninety degrees apart in phase which are applied to the video amplifier and color decoder circuit 18. One output of a local oscillator 24 is also applied to the carrier frequency control circuit wherein the phase and frequency of the burst is compared respectively to the phase and frequency of the selected oscillator output. A differential output voltage from the carrier frequency control is fed back into the oscillator to lock the output thereof in phase and frequency with the burst. The variable phase shifter 22 is located at the input to the carrier frequency control to compensate for any phase shift in the generated subcarrier that may take place in the frequency control circuit or oscillator. Compensation is made by adjusting the phase shifter to synchronize the phase of the selected subcarrier with that of the burst in the composite signal appearing at the input terminal of the video circuit 18.

In the video amplifier and color decoder circuit 18 the luminance and chrominance portions of the composite signal are separated by filter processes. The chrominance portion is modulated with the subcarriers from oscillator 24 in a demodulator producing two chromaticity signals which are filtered and applied, along with the luminance portion, to a control gain matrix included in the video circuit. In the matrix the chromaticity signals and the luminance signal are added in chosen proportions to provide simultaneous red, blue and green picture signals to a color picture tube system 25. The color picture system 25 may be, for example by the way of illustration, a tricolor kinescope of the type described in the Petition of the Radio Corporation of America and the National Broadcasting Company, Incorporated before the Federal Communications Commission June 25, 1953, pages 277 through 282.

The horizontal and vertical synchronizing signals are stripped from the composite color signal in the deflection synchronizer 19, separated and applied to the horizontal and vertical deflection circuit 26 wherein the horizontal and vertical deflection signals are generated. These signals are applied to the appropriate deflection electrodes of the color picture tube system.

In a complete color television system such as that outlined above, the picture produced at the color picture tube system 25 is a true representation of the colors of the elemental scene area scanned by the pick-up tube due to the fact that color subcarriers generated in the receiver are accurately synchronized in frequency and phase with the transmitter subcarriers by the color synchronizer and, in particular, the burst separator circuit thereof in accordance with the invention.

Figure 3:
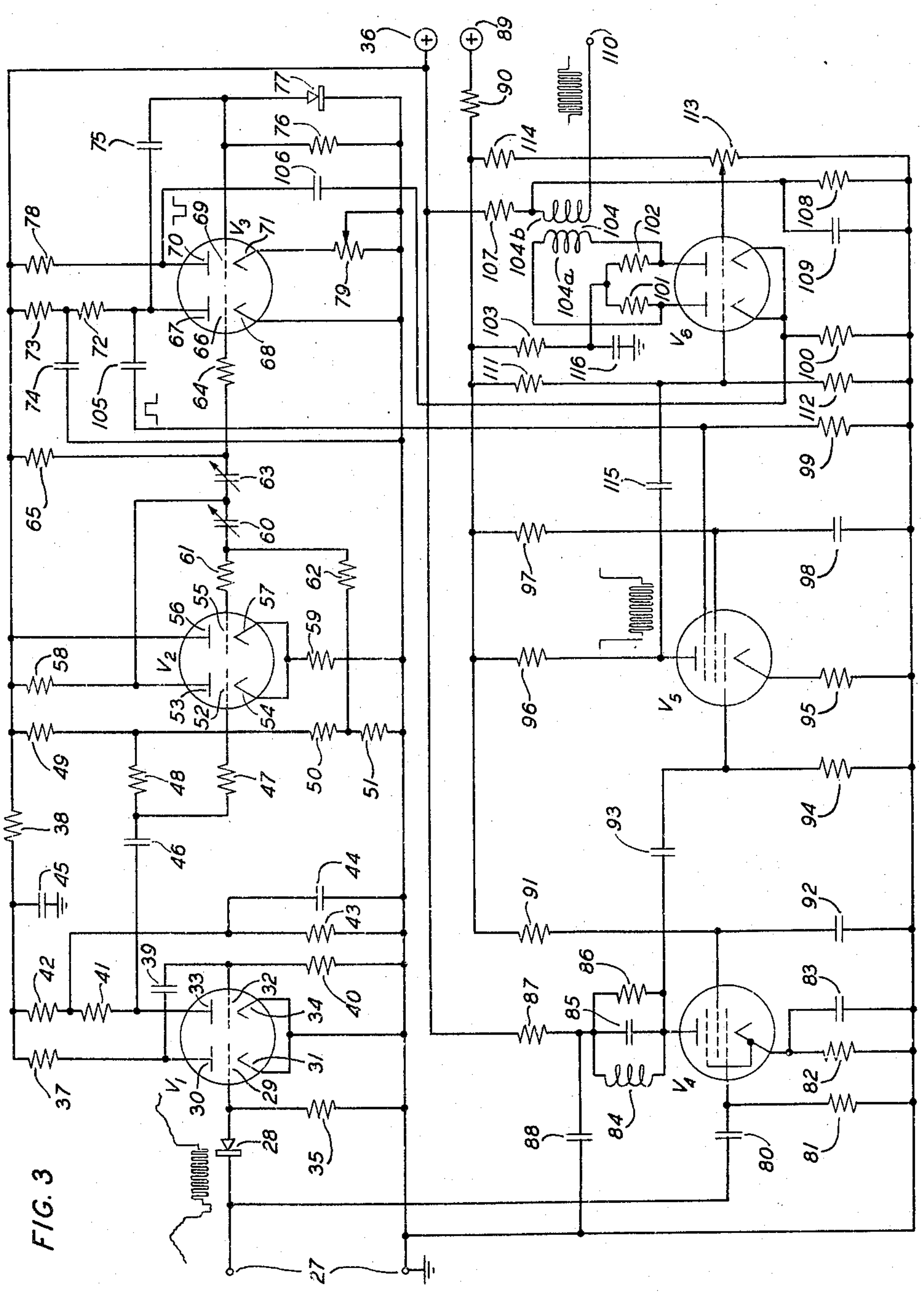
Fig. 3 is a circuit diagram in schematic form of a gating pulse generator and burst separator in accordance with the invention.

The operation of the gate pulse generator and burst separator circuits in accordance with the invention, shown in schematic form in Fig. 3, will now be described in greater detail. In the figure tubes $V_1$, $V_2$, and $V_3$ with their associated circuit elements comprise the gate pulse generator 20 of Fig. 1 and tubes $V_4$, $V_5$ and $V_6$ with their associated circuit elements comprise the burst separator 21 of Fig. 1. The composite color picture signal is applied to the video input terminals 27. The video portion of the composite signal is clipped by the diode 28 and the remaining portion of the signal including the blanking pulses, horizontal and vertical synchronizing pulses and burst are applied to grid 29 in the first section of double triode tube $V_1$. A bias voltage is provided to grid 29 by resistor 35. The anode 30 of the first section is connected to a source of constant potential 36 through resistors 37 and 38 and also to the grid 32 of the second section through coupling capacitor 39. The cathodes 31 and 34 are directly coupled to ground potential. The grid 32 is also connected to ground potential through bias resistor 40. Anode 33 of the second section is connected to source 36 through resistors 41, 42 and 38, the junction of resistors 41 and 42 being connected to ground through a parallel connected resistor 43 and capacitor 44. A by-pass capacitor 45 is connected to ground from the junction of resistors 37, 38 and 42. In the circuitry of tube $V_1$, the horizontal and vertical synchronizing signals are stripped from the signal gated through diode 28. These stripped signals appear at the anode 33 and are coupled to tube $V_2$ through capacitor 46 and resistor 47. Capacitor 46 is also coupled through resistor 48 to a voltage divider comprising resistors 49, 50, and 51. Tube $V_2$ acts as a clamper circuit developing pulses from the stripped pulses that are tuned to coincide with the start of the color bursts. The stripped signals are applied through resistor 47 to grid 52 associated with the first section of the double triode $V_2$. Anode 53 is connected to source 36 through load resistor 58 and cathode 54 is coupled directly to cathode 57 of the second section and to ground potential through resistor 59. The output of the first section appearing at anode 53 is applied to the grid 55 of the second section through variable capacitor 60 and resistor 61. Resistor 62 which is connected between the junction of resistors 50 and 51 and the junction of capacitor 60 and resistor 61 along with resistor 59 provides grid bias to grid 55. The anode 56 of the second section is connected directly to source 36. This clamper circuit uses the leading edge of the horizontal and vertical synchronizing pulses as a timing reference and after inserting a small amount of delay by means of variable capacitor 60 develops a negative going pulse that is timed to coincide with the start of the color synchronizing burst. The operation of the clamper is described in greater detail with relation to Fig. 3 of a patent application to B. M. Oliver, Serial No. 72,045 filed January 21, 1949, now Patent 2,660,614 issued November 24, 1953.

The negative pulse is coupled to the first section of tube $V_3$ from capacitor 60 through variable capacitor 63 and resistor 64. Capacitor 63 and resistor 64 are also connected to source 36 through resistor 65. Tube $V_3$ is a double triode that produces a positive and a negative gating pulse of equal amplitude, simultaneous occurrence and equal duration. The first section of the tube comprises grid 66 which is connected to resistor 64, anode 67 which is connected to source 36 through resistors 72 and 73 including a bypass capacitor 74 to ground, and cathode 68 which is connected to ground potential. The second section comprises grid 69 which is connected to anode 67 through coupling capacitor 75 and to ground through parallel connected resistor 76 and diode 77, anode 70 which is connected to source 36 through resistor 78, and cathode 71 which is connected to ground potential through potentiometer 79, the center tap of which is connected directly to ground. The negative pulse applied to grid 66 cuts off the first section of $V_3$ for a period of time determined by variable capacitor 63, thereby producing at anode 67 a positive pulse. This positive pulse is applied to the grid 69 of the second section wherein there is produced at the anode 70 a negative pulse. The pulses are the gating pulses used to control the burst separator. By adjustment of capacitors 60 and 63, these pulses can be made to occur simultaneously with the color synchronizing pulse and to have the same duration. The operation of the pulse generator of tube $V_3$ is described in greater detail with respect to Fig. 3 in the above-mentioned patent application to B. M. Oliver.

Composite picture signals from terminals 27 are applied to the control grid of amplifier tube $V_4$ in the burst separator circuit through capacitor 80. Grid bias resistor 81 is connected between ground potential and the control grid. The suppressor grid of $V_4$ is connected to the cathode which is connected in turn to ground potential through parallel connected resistor 82 and capacitor 83. The anode is connected through a tuned circuit comprising parallel connected inductor 84, capacitor 85 and resistor 86 and through a load resistor 87 to source 36. A bypass capacitor 88 is connected between the load resistor 87 and the tuned circuit to ground potential. The screen grid of $V_4$ is coupled to series connected resistor 90 and constant potential source 89 through load resistor 91 and to ground through capacitor 92. The tuned circuit is of a low Q and is tuned to the frequency of color synchronizing burst thereby preventing any phase shift in the burst signal. The amplified composite signal is applied from the anode of $V_4$ to the control grid of tube $V_5$ through coupling capacitor 93. Tube $V_5$ is the first gating stage in the burst separator circuit and is normally biased beyond cutoff. Cutoff bias is established in tube $V_5$ by a large resistor 94 connected between the control grid and ground potential and a small resistor 95 connected between the cathode and ground potential. The anode is connected to resistor 90 through load resistor 96. The screen grid is connected to resistor 90 through resistor 97 and to ground potential through capacitor 98. The positive gating pulse from the first section of tube $V_3$ is applied through coupling capacitor 105 to the suppressor grid of tube $V_5$ which is in turn biased by high impedance resistor 99. During the period of the gating pulse, tube $V_5$ is made to conduct thereby producing the color synchronizing burst at the anode. The signal at the anode includes, however, a step voltage introduced by the gating pulse. Inasmuch as the step voltage includes high frequency components at its leading and trailing edges which affect the frequency and phase of the burst signal it is desirable to remove all vestige of the step. To remove the step and also to make certain that the color burst and no other portion of the composite signal is gated through, a second gating stage comprising $V_6$ and its associated circuit is employed.

Tube $V_6$ is a double triode connected in push-pull relationship. The cathodes are coupled and connected to ground potential through resistor 100. Balancing resistors 101 and 102 connected to the respective anodes are coupled through load resistor 103 to resistor 90 and through bypass capacitor 116 to ground. Connected across the anodes is the primary winding 104*a* of transformer 104. One terminal of the secondary winding 104*b* is connected to source 36 through resistor 107 and to ground potential through parallel resistor 108 and capacitor 109. The other terminal of the secondary winding is the output terminal 110 of the burst separator circuit. A voltage divider comprising resistors 111 and 112 connected between resistor 90 and ground potential provides a bias voltage to the grid of the first section. The grid of the second section is connected to the center tap of a balancing potentiometer 113 which is connected in series with resistor 114 between resistor 90 and ground potential. The signal from gating stage $V_5$ comprising the color synchronizing burst superimposed on a step voltage is applied to the grid of the first stage of $V_6$ through coupling capacitor 115 and the negative gating pulse from the second section of tube $V_3$ in the gate pulse generator is applied to the cathodes of $V_6$ through coupling capacitor 106. The double triode conducts only when the negative gating pulse is present. During the conduction period of the step voltage applied to the grid of the first section is cathode coupled to the second section thereby causing a decrease in plate voltage in the second section of $V_6$ while simultaneously causing an increase in plate voltage in the first section. However, the primary 104(*a*) of transformer 104 is connected between the two anodes of $V_6$, and effectively shorts these two anodes together as far as the D.-C. components of the signal in the output are concerned, hence the step voltage is substantially eliminated from the output, leaving only the A.-C. components of the signal. Thus, tube $V_6$ is a push-pull stage that has a transformer 104 in the plate circuit, and during the gating period a signal appears at the output terminal 110 comprising only the color synchronizing burst.

While many values for the circuit elements may be chosen, values used in one exemplary embodiment of the invention wherein the burst frequency was 3.57 megacycles are:

| | |
|---|---|
| $V_1$ | 12AX7. |
| $V_2$ | 396A (Western Electric). |
| $V_3$ | 396A (Western Electric). |
| $V_4$ | 404A (Western Electric). |
| $V_5$ | 6AS6. |
| $V_6$ | 396A (Western Electric). |
| **28** | 400B diode (Western Electric). |
| **35** | 510 ohms. |
| **36** | 300 volts. |
| **37** | 18,000 ohms. |
| **38** | 10 ohms. |
| **39** | .01 microfarad. |
| **40** | 1 megohm. |
| **41** | 4,700 ohms. |
| **42** | 42,000 ohms. |
| **43** | 18,000 ohms. |
| **44** | 20 microfarads. |
| **45** | 20 microfarads. |
| **46** | 1100 micro-microfarads. |
| **47** | 100 ohms. |
| **48** | .56 megohm. |
| **49** | .27 megohm. |
| **50** | 12,000 ohms. |
| **51** | 39,000 ohms. |
| **58** | 12,000 ohms. |
| **59** | 6,200 ohms. |
| **60** | 50 micro-microfarads. |
| **61** | 100 ohms. |
| **62** | .11 megohm. |
| **63** | 50 micro-microfarads. |
| **64** | 100 ohms. |
| **65** | .51 megohm. |
| **72** | 2,700 ohms. |
| **73** | 27,000 ohms. |
| **74** | 20 microfarads. |
| **75** | .01 microfarad. |
| **76** | 1 megohm. |

| | |
|---|---|
| 77 | 400B diode (Western Electric). |
| 78 | 62,000 ohms. |
| 79 | 310 ohms. |
| 80 | 27 micro-microfarads. |
| 81 | 10,000 ohms. |
| 82 | 68 ohms. |
| 83 | 6800 micro-microfarads. |
| 84 | 76 microhenries. |
| 85 | 5 micro-microfarads. |
| 86 | 1,000 ohms. |
| 87 | 12,000 ohms. |
| 88 | 20 microfarads. |
| 89 | 150 volts. |
| 90 | 10 ohms. |
| 91 | 6,800 ohms. |
| 92 | 20 microfarads. |
| 93 | 75 micro-microfarads. |
| 94 | 1 megohm. |
| 95 | 220 ohms. |
| 96 | 1,000 ohms. |
| 97 | 8,200 ohms. |
| 98 | 20 microfarads. |
| 99 | 1 megohm. |
| 100 | 33,000 ohms. |
| 101 | 510 ohms. |
| 102 | 510 ohms. |
| 103 | 510 ohms. |
| 104*a* | 35 microhenries. |
| 104*b* | 35 microhenries. |
| 105 | .05 microfarad. |
| 106 | .01 microfarad. |
| 107 | 2.4 megohms. |
| 108 | 15,000 ohms. |
| 109 | .01 microfarad. |
| 111 | 1.5 megohms. |
| 112 | 10,000 ohms. |
| 113 | 20,000 ohms. |
| 114 | 1.5 megohms. |
| 115 | 68 micro-microfarads. |
| 116 | 0.01 microfarad. |

It is to be understood that the above-described arrangements are illustrative of the application of the principles of the invention, but numerous other arrangements may be devised by those skilled in the art without departing from the spirit and scope of the invention. Moreover, it is to be understood that the specific numerical constants and values given in the specification are merely by way of example and may be varied in many cases from the values given.

What is claimed is:

1. Apparatus for separating color synchronizing burst signals from composite color picture signals which comprises means responsive to said picture signals for developing positive and negative gating pulses substantially coincident with said burst signals, said gating pulses having amplitudes equal to each other and durations equal to the duration of said burst signals, first gating means supplied with said composite signals and activated by said positive gating pulses for passing during the occurrence of said positive gating pulses said burst signals superimposed on step voltages representative of said positive gating pulses, means for removing said step voltages comprising a gated differential amplifier including a pair of amplifier elements connected in push-pull relationship, each of said elements having a control element, a cathode and an anode, means for applying said step voltages with superimposed burst signals to the control terminal of one of said amplifying elements, means for applying a selected reference potential to the control electrode of the other of said amplifiers, means for applying said negative gating pulses to the common cathodes of said amplifying elements for conditioning said differential amplifier during the occurence of said negative gating pulses to pass only said burst signals, and means connected to the anodes of said amplifying elements for inductively coupling the output of said differential amplifier to a load circuit.

2. Apparatus for separating color synchronizing burst signals from composite color picture signals which comprises, in combination, a source of composite video signals, a gate pulse generator supplied with said composite picture signals, said gate pulse generator comprising means for separating horizontal synchronizing pulses from said applied composite signal, means responsive to the leading edge of each of said synchronizing pulses for generating a negative-going timing pulse, means for delaying said timing pulses so that the leading edge of consecutive ones of said timing pulses coincide with the start of the interval of consecutive ones of said color burst signals, means for adjusting the duration of said timing pulses to equal the duration of said burst signals, and phase splitting means supplied with said timing pulses for producing a positive and a negative pulse of equal amplitude and of simultaneous occurrence with and equal duration to said burst signals, and a burst separator supplied with said composite picture signals, said burst separator comprising means tuned to the frequency of said burst signals for amplifying said composite signals, first normally non-conducting amplifier means supplied with said amplified composite signals, means for applying said positive gating pulses to said first amplifier means for rendering it conductive only during gating intervals thereby to produce at the output of said first amplifier means step voltages corresponding to said positive gating pulses upon which are superimposed burst signals, normally non-conductive differential amplifier means supplied with said burst signals superimposed on said step voltages, means for applying said negative gating pulses to said differential amplifier means thereby to render said differential amplifier means conductive only during gating intervals, means for balancing the conductiion of said differential amplifier means with a reference level of conduction thereby to insure that the output of said differential amplifier means includes only said burst signal devoid both of said gating pulses and spurious signals of either polarity, and inductive coupling means for supplying recovered burst signals to an output terminal.

References Cited in the file of this patent

UNITED STATES PATENTS

| | | |
|---|---|---|
| 2,092,496 | Branson | Sept. 7, 1937 |
| 2,335,278 | Hilferty | Nov. 30, 1943 |
| 2,519,763 | Hoglund | Aug. 22, 1950 |
| 2,521,824 | Brown | Sept. 12, 1950 |
| 2,538,500 | Bess | Jan. 16, 1951 |
| 2,594,449 | Kircher | Apr. 29, 1952 |
| 2,614,215 | Karp et al. | Oct. 14, 1952 |
| 2,660,672 | Urtel | Nov. 24, 1953 |
| 2,751,431 | Kennedy | June 19, 1956 |
| 2,754,356 | Espenlaub | July 10, 1956 |
| 2,775,691 | Rennick | Dec. 25, 1956 |
| 2,802,940 | Burton | Aug. 13, 1957 |

FOREIGN PATENTS

| | | |
|---|---|---|
| 141,257 | Australia | May 16, 1951 |